US005510827A

United States Patent [19]

Kubota et al.

[11] Patent Number: 5,510,827

[45] Date of Patent: Apr. 23, 1996

[54] LASER BEAM PRINTER WITH COOLING ARRANGEMENTS FOR OPTICAL BOX

[75] Inventors: Takeshi Kubota, Tokyo; Hideaki Watanabe, Yokohama, both of Japan

[73] Assignee: Canon Kabushiki Kaisha, Tokyo, Japan

[21] Appl. No.: 498,460

[22] Filed: Jul. 5, 1995

Related U.S. Application Data

[63] Continuation of Ser. No. 79,823, Jun. 23, 1993, abandoned.

[30] Foreign Application Priority Data

Jun. 30, 1992 [JP] Japan .................................. 4-196070

[51] Int. Cl.$^{6}$ .................................................. G01D 15/14

[52] U.S. Cl. ........................................... 347/257; 347/263

[58] Field of Search ............................ 355/30, 200, 215, 355/233; 346/160.1, 108, 76 L, 160; 361/690, 694, 695, 697; 347/138, 257, 263

[56] References Cited

U.S. PATENT DOCUMENTS

| | | | |
|---|---|---|---|
| 4,297,713 | 10/1981 | Ichikawa et al. | 346/108 |
| 4,351,005 | 9/1982 | Imai et al. | 358/300 |
| 4,469,430 | 9/1984 | Terashima | 346/160 |
| 4,875,063 | 10/1989 | Idenawa et al. | 346/160.1 |

FOREIGN PATENT DOCUMENTS

| | | |
|---|---|---|
| 0070506 | 5/1982 | Japan . |
| 0292166 | 12/1986 | Japan . |
| 0231071 | 9/1989 | Japan . |
| 0183274 | 7/1990 | Japan . |
| 0527531 | 2/1993 | Japan . |

*Primary Examiner*—Robert Beatty
*Attorney, Agent, or Firm*—Fitzpatrick, Cella, Harper & Scinto

[57] ABSTRACT

A cooling arrangement for a laser beam printer apparatus which contains an optical box containing a laser beam deflector, a plastic lens which transmits a deflected laser beam, and an electronic package board. A cooling fan draws air in from the outside of the apparatus and passes the drawn-in air through the cooling fan directly to the optical box. To achieve more efficient cooling of the apparatus: (1) a portion of the electronic package board is projected from the optical box, and at least some heat-generating components of the electronic package board are provided on the projected portion; (2) the optical box and the electronic package board are arranged apart from each other, intervened by a recording sheet conveying unit; and/or (3) the optical box is provided with cooling fins. Specific cooling of the optical box is achieved by providing the cooling fan near to the optical box and electrically connected to the optical box.

28 Claims, 14 Drawing Sheets

LASER BEAM PRINTER WITH COOLING ARRANGEMENTS FOR OPTICAL BOX

This application is a continuation of application Ser. No. 08/079,823 filed Jun. 23, 1993, now abandoned.

BACKGROUND OF THE INVENTION

The present invention relates to a laser beam printer apparatus and, more particularly, to means for cooling a scanning optical system which scans a laser beam.

DESCRIPTION OF THE RELATED ART

The related art will be described with reference to FIG. 12, 13 and 14. FIG. 12 is a perspective view of a known laser beam printer. The laser beam printer 100 comprises: a scanning optical system (referred to as "the scanner unit" hereinafter) 111 for emitting and deflecting a laser beam modulated in accordance with image signals; an AC power unit 101 for inputting AC power; a DC power unit 102 for converting AC power to a low voltage DC power; a high voltage power unit 103 for forming an image by the electrophotographic process; and a sheet cassette 104 containing recording sheets P, the sheet cassette 104 being firmly attached to a frame 105 of the laser beam printer 100. The laser beam printer 100 has upper and lower casings which are pivotably connected so that the upper casing can be swung open and closed. A process cartridge 106 housed in a cartridge cover 107 is attached to the upper casing so as to come into contact with high voltage contacts 108 provided in the lower casing when the upper casing is closed. A cooling fan 109 is provided on top of the AC power unit 101. The cooling fan 109 cools the printer 100 by drawing air from the inside to the outside of the printer 100. The laser beam printer 100 further comprises a sheet conveyer unit 110 for conveying a recording sheet P from the sheet cassette 104 through the printer 100.

The scanner unit 111 will be described with reference to FIG. 13. A laser oscillator 112 provided in the scanner unit 111 emits a beam, which is reflected by the mirror surfaces of a polygonal mirror 113 driven by a rotor. The beam is thus scanned. The beam scanned by the polygonal mirror 113 passes through an imaging lens 114 and, via a director mirror 115, is focused on a photosensitive drum 116. The scanning beam positioned at the starting side of a scanning line is reflected by reflector mirror 117 so as to strike a photoreceiving end 118*a*, that is, an end of optical fiber 118. The optical fiber 118 conducts the beam to a scanning initiation signal processing circuit having an optical sensor. The scanner unit 111 further comprises a printed circuit board 120 which is packaged with an IC (integrated circuit) chip 119 having a signal processing circuit for rotationally driving the polygonal mirror 113.

The polygonal mirror 113 which is to be rotated by the rotor will be described with reference to FIG. 14. The polygonal mirror 113 is fixed to the top surface of a flange 122 of a rotary shaft 121. The flange 122 is firmly connected at its bottom to a rotor 124. The rotor 124 is fixed to a driving magnet 123 which is a component of a driving motor. Facing the driving magnet 123, a stator coil 125 is fixed to the printed circuit board 120, which is provided below the rotor 124 and packaged with a motor control circuit and the like.

The above-described optical components of the scanner unit 111 are contained in an optical box 126 having a lid 127 which shields the optical components from dust.

However, in the above scanner unit, because the IC chips and the stator coil packaged on the printed circuit board are enclosed in a small and closed space inside the optical box, the IC chips and the stator coil become heated and, thus, the temperature inside the optical box rises while the scanner unit is being driven. Because of the heat, the optical precision of the optical components inside the optical box may deteriorate.

This problem will be particularly serious if the imaging lens is made of plastic. When receiving heat, a plastic lens is liable to deform, resulting in fluctuation of the refraction index thereof. If the refraction index of the imaging lens is varied, the laser beam becomes substantially distorted, thus failing to form a desirable image.

SUMMARY OF THE INVENTION

An object of the present invention is to provide a laser beam printer apparatus which achieves effective cooling of the scanner unit that emits a laser beam.

Another object of the present invention is to provide a laser beam printer apparatus which achieves specific cooling of the scanner unit.

Still another object of the present invention is to provide a laser beam apparatus in which the recording medium conveying unit is arranged between the scanner unit and the packaged circuit board.

A further object of the present invention is to provide a laser beam printer apparatus whose scanner unit has a cooling member.

A still further object of the present invention is to provide a laser beam printer apparatus in which the scanner unit is electrically connected to cooling means.

Further objects, features and advantages of the present invention will become apparent from the following description of the preferred embodiments with reference to the attached drawings.

DETAILED DESCRIPTION OF THE PREFERRED EMBODIMENTS

Preferred embodiments of the present invention will be described hereinafter with reference to the drawings.

Figure 1:
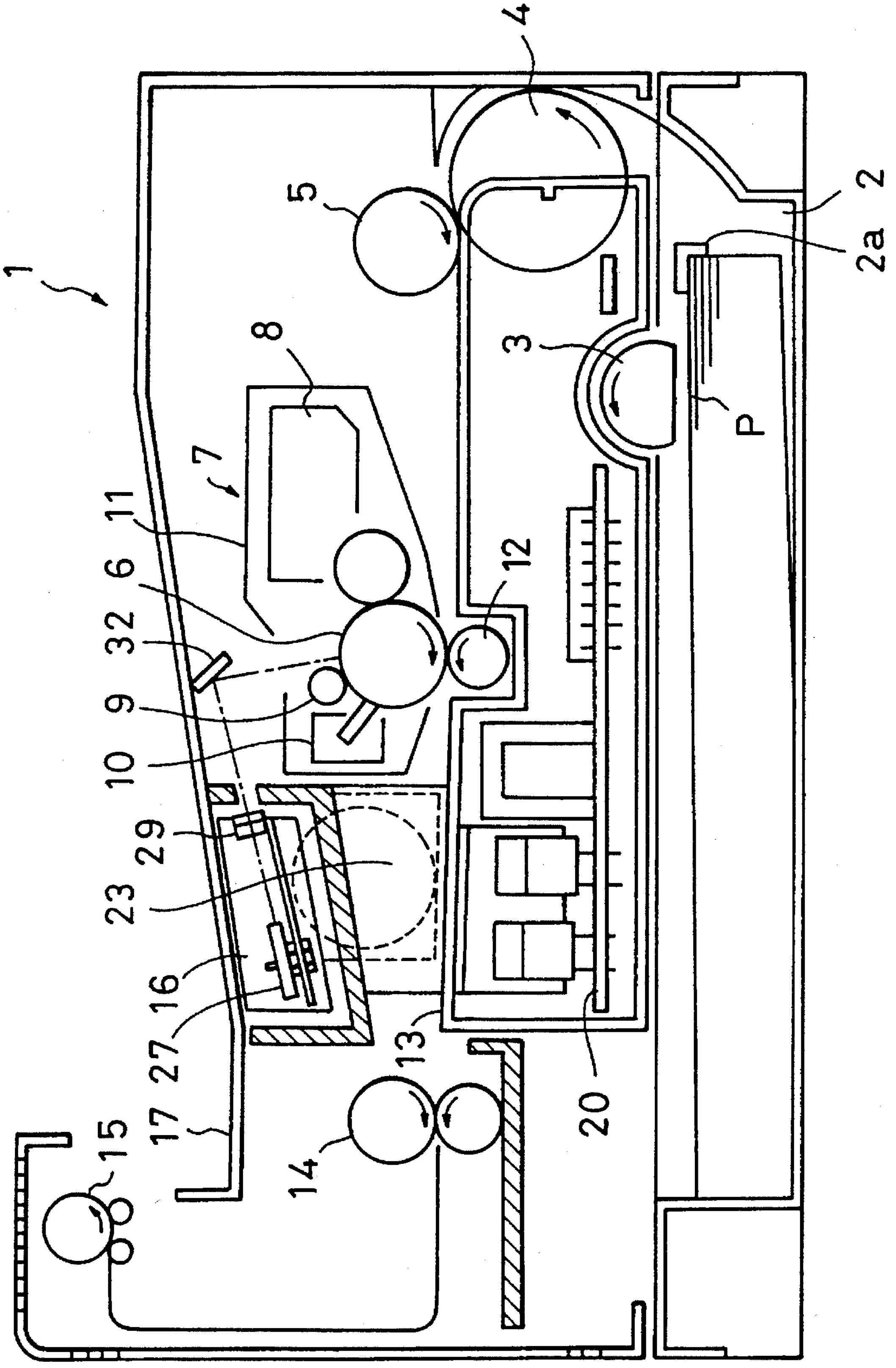
FIG. 1 is a longitudinal sectional view of an embodiment of the laser beam printer apparatus of the present invention.

Referring to FIG. 1, a laser beam printer 1 comprises: a sheet cassette 2 containing recording sheets P; a pick-up roller 3 for picking up recording sheets P from the cassette 2; a sheet separator member 2*a* for ensuring that the recording sheets will be sent out from the sheet cassette 2 one at a time; a conveying roller 4 for conveying a recording sheet fed from the sheet cassette 2; a tracking control roller 5 for ensuring that a recording sheet P will follow the predetermined course; a photosensitive drum 6; a process cartridge 7; a developer unit 8 for developing an image on the photosensitive drum 6; a charger unit 9; a cleaner 10 for cleaning the photosensitive drum 6; a casing 11; a transfer roller 12 for transferring a developed image from the photosensitive drum 6 to a recording sheet P; a recording sheet guide plate 13; a fuser unit 14; a pair of send-out rollers 15; a laser beam scanning optical system (scanner unit) 16 for scanning a laser beam L; and a tray 17 onto which a recording sheet P is discharged.

The printing operation of this apparatus will be described. To initiate the printing operation, a host computer sends printing data designated by a user to the printer apparatus. The printer apparatus, when receiving a print instruction (signal), conveys a recording sheet P from the cassette to the image transfer section. The photosensitive drum 6 is scanned by a laser beam L so that a latent image is formed thereon. Then, the developer unit 8 develops the latent image by applying a dry toner to the photosensitive drum 6. The developed image is transferred from the photosensitive drum 6 to the recording sheet P by means of the transfer roller 12. The toner image thus transferred onto the recording sheet P is fixed by a fuser unit 14.

Figure 2:
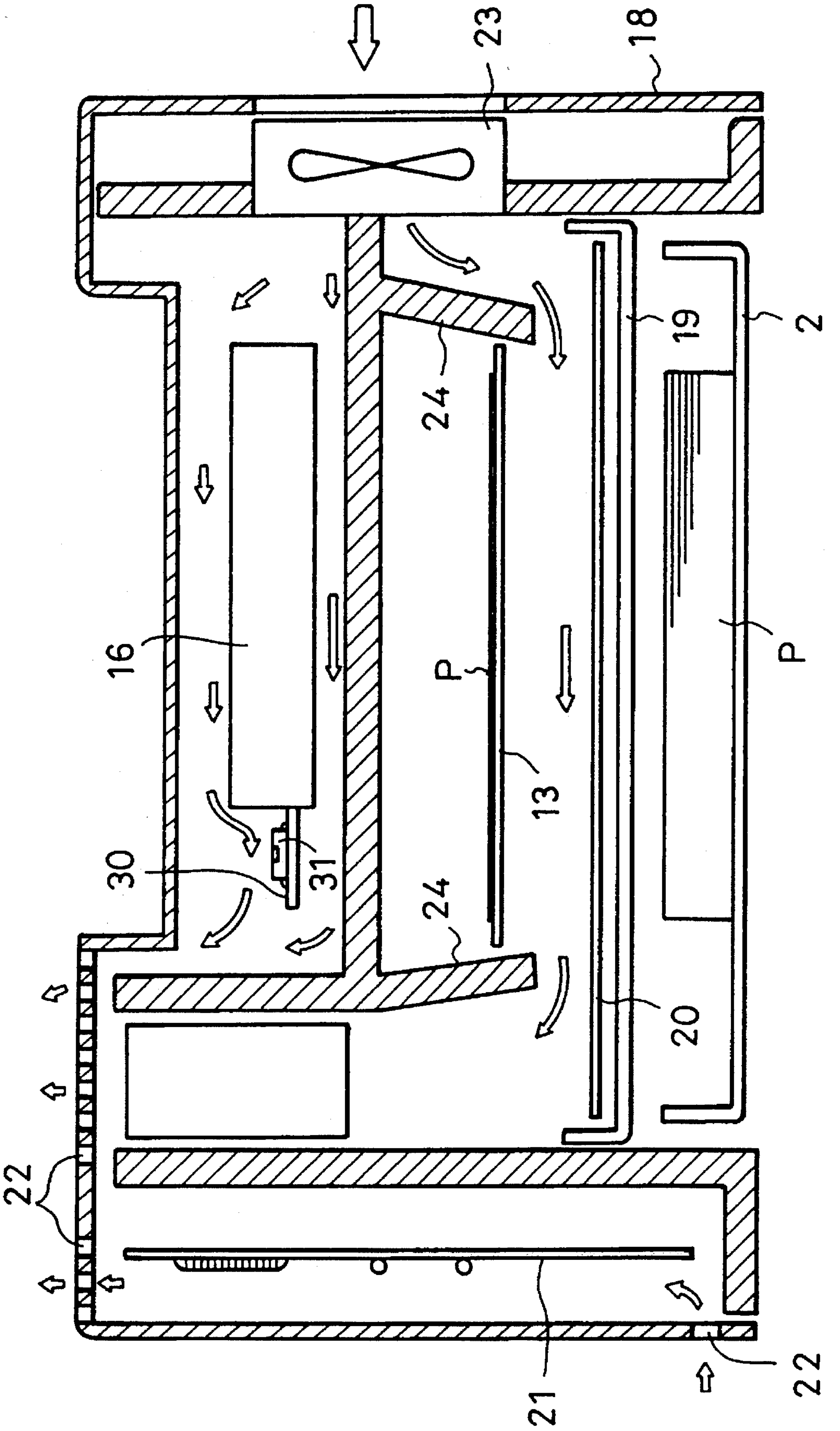
FIG. 2 is a transverse section of the laser beam printer apparatus shown in FIG. 1, viewed from the front.

Referring to FIG. 2, the sheet cassette 2 is inserted in a bottom portion of a frame 18 of the laser beam printer 1, and an electronic package unit 20 is supported by a base 19 provided above the sheet cassette 2. The electronic package unit 20 has a printed circuit board packaged with circuit components, and controls various image forming means and the sequence of the overall operation of the apparatus.

The recording sheet guide plate 13 for guiding a recording sheet carrying a toner image which is not fixed yet is arranged above the electronic package unit 20 so the recording sheet guide plate 13 separates the electronic package unit 20 from the scanner unit 16, which is arranged above the recording sheet guide plate 13.

A control circuit board 21 for controlling communication with the host computer is provided near a left-side portion of the frame 18. The left-side portion of the outer wall of the frame has ventilating holes 22. A cooling fan 23, that is, cooling means, is provided at a right-side portion of the frame 18, in a position close to the scanner unit 16.

The cooling fan draws air from the outside to the inside of the apparatus. As indicated by the arrows in FIG. 2, the air drawn in strikes the scanner unit 16 and the electronic package unit 20 directed by airflow guides 24, and then the air is let out from the ventilating holes 22.

The airflow guides 24 are arranged on both sides of recording sheet conveying unit including the recording sheet guide plate 13 (one of the sides being close to the cooling fan 23 and the other close to the ventilating holes 22). Thus, the airflow guides 24 guide a stream of air toward the electronic package unit 20 and shield the recording sheet on the guide plate 13 from the air stream.

The scanner unit 16 will be described hereinafter. The scanner unit 16 is provided in an upper portion of the laser beam printer apparatus 1 and scans a laser beams L onto the photosensitive drum 6, which is placed below the scanner unit 16.

Figure 3:
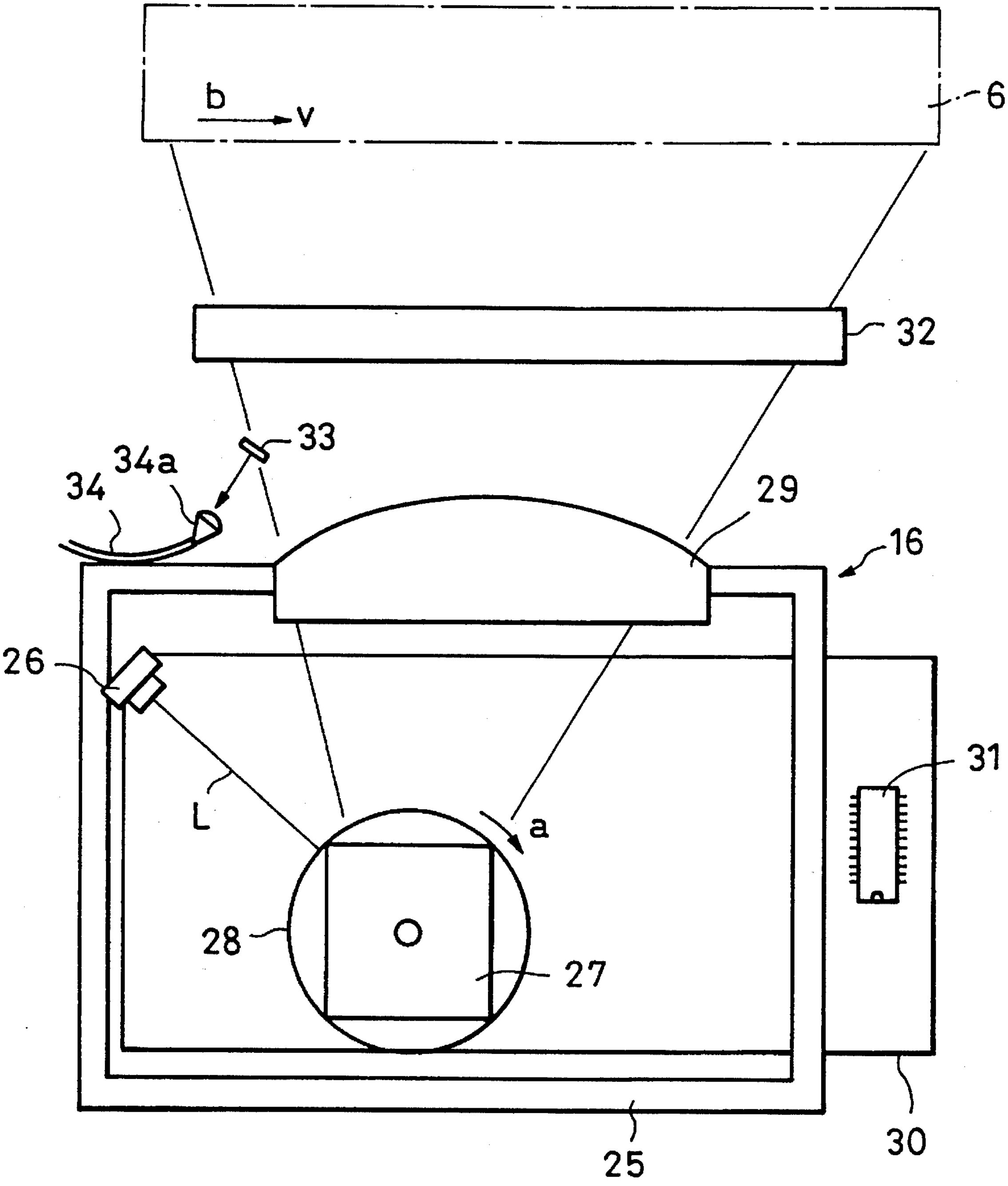
FIG. 3 illustrates a scanner unit according to the present invention.

FIG. 3 illustrates the scanner unit 16 in detail. The components of the scanner unit 16 are housed in an optical box 25. The components are: a laser oscillator 26; a polygonal mirror 27, that is, deflection means; a rotor 28; a plastic imaging lens 29 having f-θ characteristics; an electronic package board 30; IC chip 31 mounted on the board 30 and having signal processing circuitry for driving the mirror 27; and a reflective mirror 33 positioned at the starting side of the beam scan and reflecting the beam so as co strike the photo-receiving end 34*a* of optical fiber 34 which carries the beam to a scan initiation signal processing circuit.

A beam emitted from the laser oscillator 26 is reflected by the polygonal mirror 27, thus achieving a scanning beam. The polygonal mirror 27 is fixed no the top of the rotor 28, which is a component of a motor for rotating the polygonal mirror 27. The rotor 28 is composed of a magnet and a plate (flange) (neither being shown) for fixing the polygonal mirror 27. The rotor 28 faces a stator fixed to the electronic package board 30. Thus, the polygonal mirror is rotated together with the rotor 28. The electronic package board 30 is packaged with an integrated circuit (IC) chip 31 having a signal processing circuit, control circuit and polygonal mirror driving circuit for driving the polygonal mirror 27.

The polygonal mirror 27 is rotated in the direction indicated by the arrow a, and the scanning beam achieved by the polygonal mirror 27 passes through the imaging lens 29 and is thereby focused on the photosensitive drum 6, via a director mirror 32. The scanning beam is shifted in the direction indicated by the arrow b at a rate of V. The scanning beam positioned at the starting side of a scanning line is reflected by a reflector mirror 33 so as to strike the photo-receiving end 34*a* of the optical fiber which conducts the beam to a BD (beam detect) photo-receiving portion provided on a circuit board. This circuit board has a BD processing circuit besides the BD photo-receiving portion and is arranged parallelly (or perpendicularly) to the optical system. The optical fiber 34 is arranged in a positioned apart from the imaging lens 29 and, more specifically, apart from the light path between the imaging lens 29 and the director mirror 32.

The electronic package board 30 packaged with a polygonal motor driving circuit, the signal processing circuit, the control circuit, etc., protrudes from the optical box 25. On the portion protruding from the optical box 25 is provided at least one circuit (IC) or electric component, such as IC 31, which generates a substantial amount of heat.

Because the cooling fan draws in air from the outside so that the air strikes the optical box of the scanner unit, this embodiment achieves more efficient and specific cooling of the optical box than a conventional apparatus in which air is drawn out from the inside of the apparatus. Thus, this embodiment reduces adverse effects caused by the heat generated by the optical components of the scanner unit.

The efficient and specific cooling of the optical box according to this embodiment will achieve great advantages particularly in a laser beam printer apparatus employing an imaging lens formed of a plastic, which in general is easily affected by heat. In short, this embodiment will substantially prevent deformation of the plastic imaging lens.

Further, because in the scanner unit according to this embodiment, its heat-generating components, such as ICs, are arranged outside the closed optical box, that is, in the cooling air passage, the heat-generating components can be efficiently cooled, and the temperature rise of the optical box can thus be curbed. Because the optical box is free from a substantial temperature rise, the size of the optical box can be reduced, thus enabling reduction of the size of the entire apparatus.

Still further, according to this embodiment, because the scanner unit and the electronic package unit are arranged apart from each other and intervened by the recording sheet conveying unit, the amount of heat transferred from the electronic package unit to the scanner unit is substantially reduced, thus curbing the temperature rise of the scanner unit.

Although the air drawn in by the cooling fan strikes the scanner unit and the electronic package unit, the air is prevented from entering the recording sheet conveying unit by the airflow guides provided in the unit. Thus, the ventilation air will not disturb the toner which has been applied to a recording sheet but not fixed yet.

Figure 4:
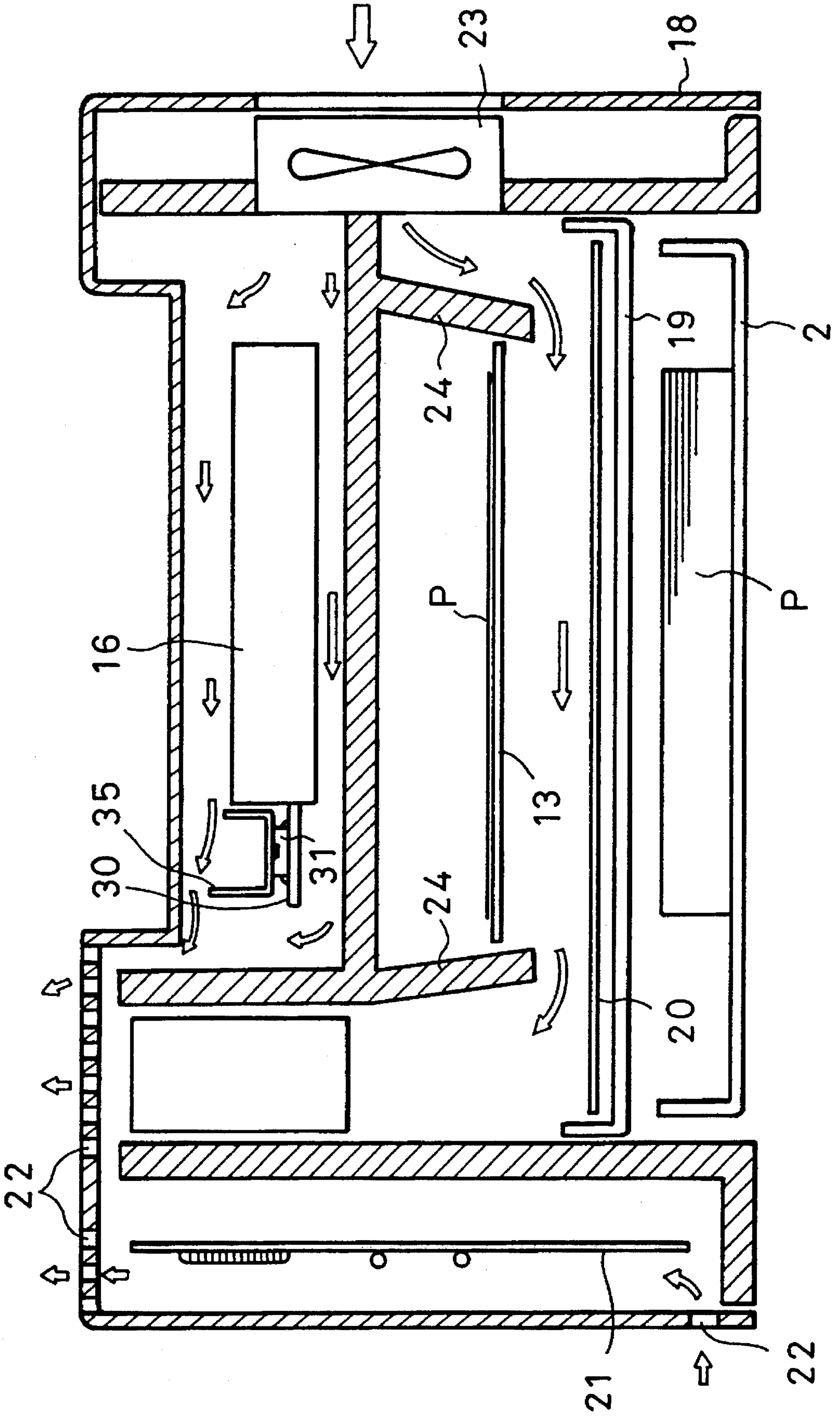
FIG. 4 is a transverse sectional view of another embodiment of the laser beam printer apparatus of the present invention.

Other embodiments of the invention will be described with reference to FIGS. 4 and 5. According to these embodiments, a portion of the electronic package board protruding from the optical box can be more efficiently cooled.

The embodiment illustrated in FIG. 4 further comprises a radiating member (referred to as "the heat sink" hereinafter) 35 made of a metal having a high thermal conductivity. The heat sink 35 is arranged in the air passage and in contact with the integrated circuits 31 provided on the portion of the electronic package board 30 which protrudes from the optical box 25 of the scanner unit 16. The thus-arranged heat sink 35 enhances the cooling of the integrating circuits.

Figure 5:
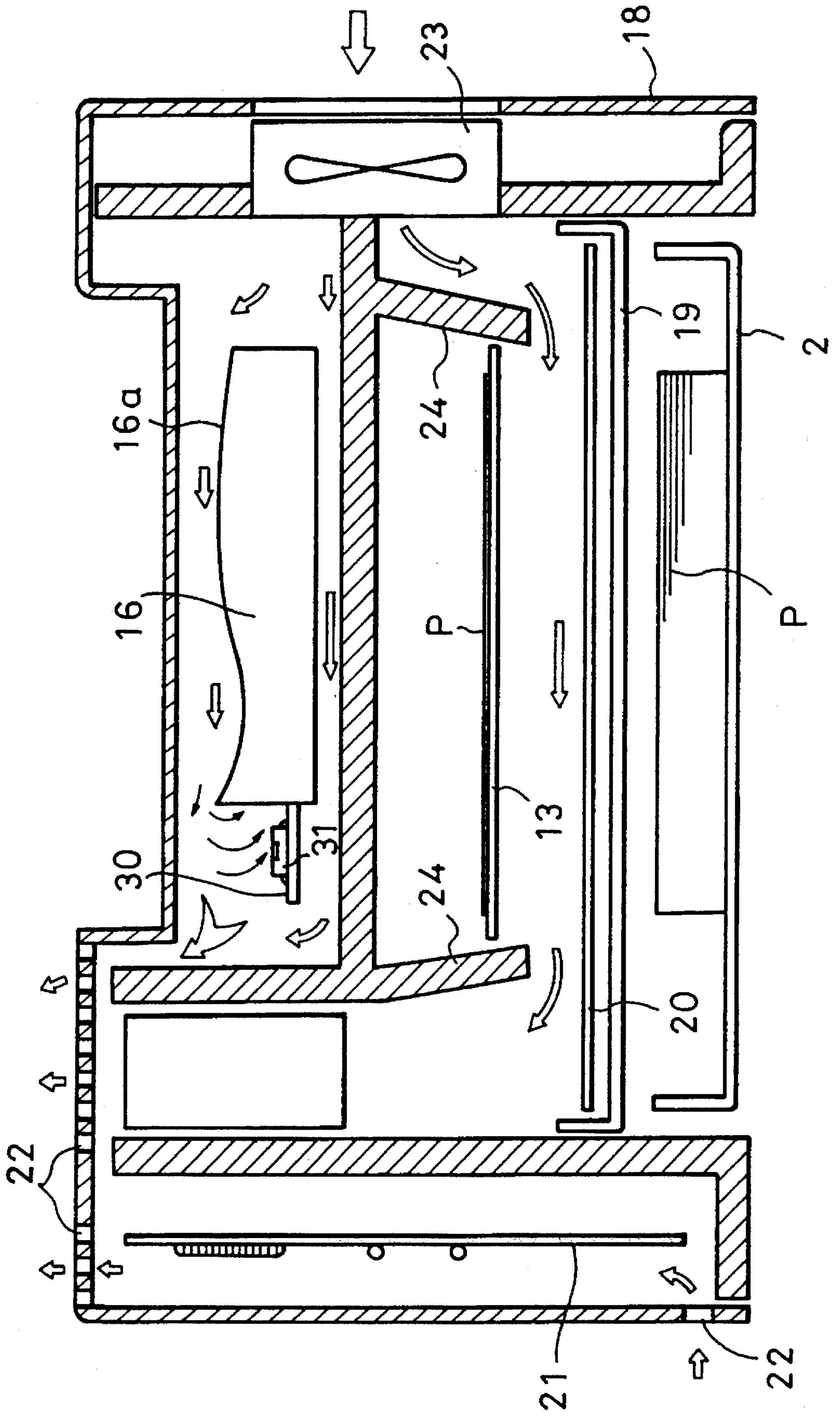
FIG. 5 is a transverse sectional view of still another embodiment of the laser beam printer apparatus of the present invention.

In the embodiment illustrated in FIG. 5, the optical box 25 of the scanner unit 16 has an upper cover **16*a* formed in the shape of a spoiler. The thus-formed upper cover 16*a* creates a substantially strong air stream reaching the heat-generating components (integrating circuits) 31 which are provided apart from the main air stream. In other words, the upper cover 16*a* achieves forced convection which efficiently cools the heat generating components 31**.

Although, according to the above embodiments, the heat-generating components are provided on the electronic package board of the scanner unit, the heat-generating components may be provided separately from the electronic package board while substantially the same cooling effects are achieved.

A further embodiment will be described, which cools the polygonal mirror and its surroundings in the scanner unit.

Figure 6:
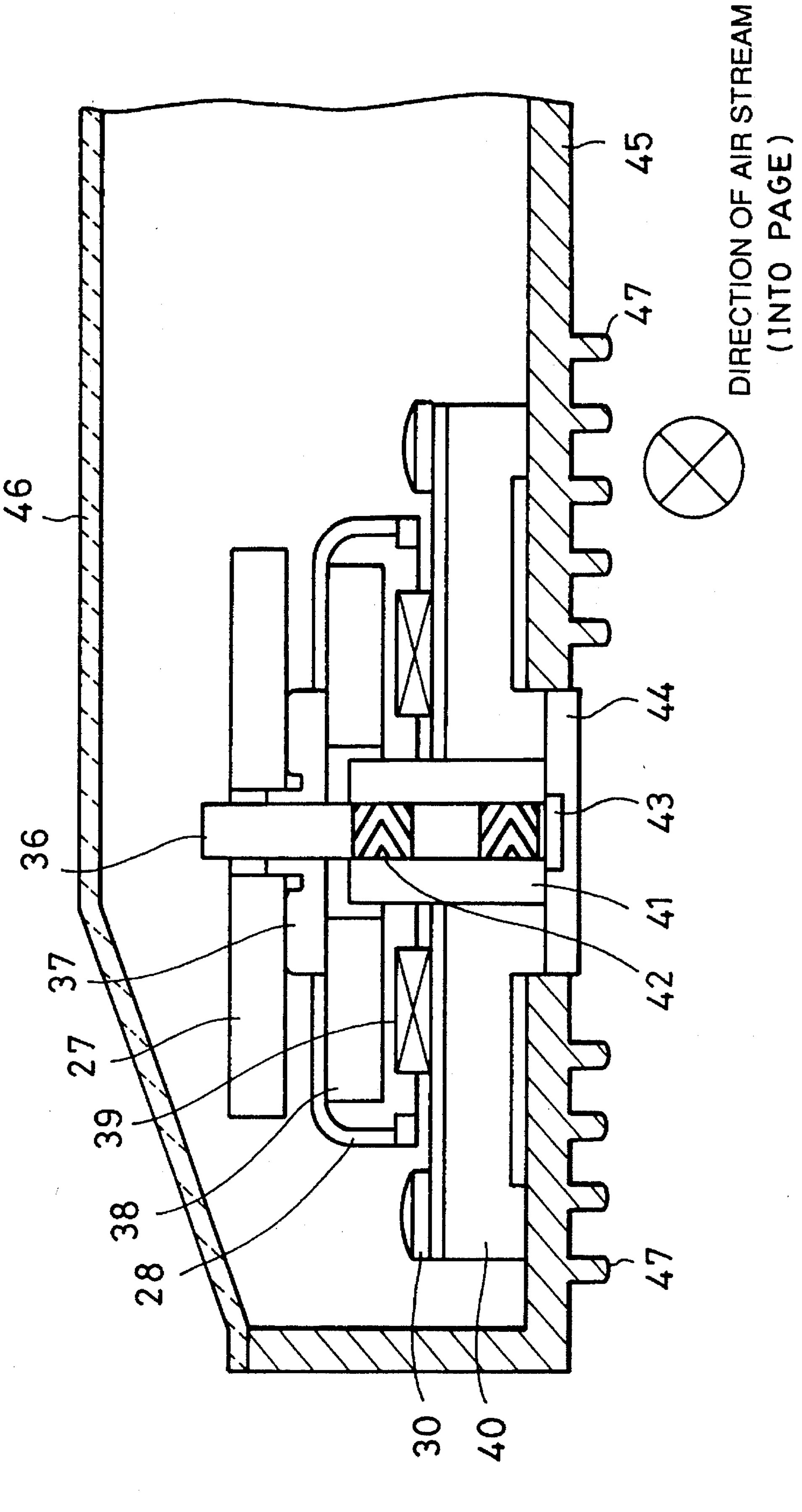
FIG. 6 is a sectional view of an embodiment of deflector means and its surroundings inside a scanner unit according to the present invention.

FIG. 6 is a sectional view of a scanner unit, that is, a deflector unit, of a laser beam printer apparatus according to this embodiment of the present invention. A polygonal mirror 27 is fixed to the top of a flange 37 of a rotary shaft 36. The flange 37 is firmly connected at its bottom to a rotor

28. The rotor 28 is fixed to a driving magnet 38, that is, a component of a driving motor. Facing the driving magnet 38, a stator coil 39, that is, another component of the driving motor, is fixed to a printed circuit board 30 which is provided below the rotor 28 and packaged with a motor control circuit and the like.

The rotary shaft 36 is rotatably fitted in a sleeve 41 which is fixed to a housing 40 which also serves as a member fixing a dynamic pressure fluid bearing. The periphery of the rotary shaft 36 has herringbone grooves 42 for generating dynamic pressure, thus constituting a dynamic pressure radial bearing. The bottom of the sleeve 41 is provided with a thrust plate 43 connected with a fixing plate 44. The thrust plate 43 has a spiral groove (not shown) on its surface facing the rotary shaft 36, thus constituting a dynamic pressure thrust bearing. The housing 40 serving as a fixing member is fixed to the printed circuit board 30 by a known method such as adhesion. The driving motor is thus composed. The driving motor is attached to an optical box 45 by, for example, using screws. The optical box 45 has a lid 46 for keeping the optical box 45 from dust.

In this embodiment, the optical box 45 has on its outside many cooling fins 47, that is, cooling means, which are formed together with or firmly connected to the optical box 45. The cooling fins 47 extend in the direction of a stream of the cooling air flowing through the inside of the laser beam printer (in the figure, perpendicular to a plane of the sheet). The cooling fins 47 provided on the outside surface of the optical box 45 increase the surface area of the optical box 45, more specifically, the area involved in heat transfer from the optical box to the cooling air, thus enhancing the cooling efficiency. The cooling effect is further enhanced by the arrangement of the cooling fins 47. The fins 47 extend in the direction of the cooling air stream so as to be substantially uniformly exposed to the cooling air. As a result, heat generated by the stator coil 39 and integrated circuits packaged with the printed circuit board 30 will be efficiently carried away by the cooling air, thus curbing the temperature rise of the optical box 45 and, therefore, the temperature rise of the bearings of the driving motor.

As described above, because the cooling fins 47 are provided on the outside surface of the optical box 45 so as to extend in the direction of the cooling air stream, this embodiment curbs the temperature rises of the optical box 45 and the bearings of the driving motor, thus lengthening the service life of the bearings.

This embodiment can be applied to various types of deflection scanning apparatus employing different types of bearing including dynamic pressure fluid bearing.

Still further embodiments having scanner units provided with cooling fins will be described.

Figure 7:
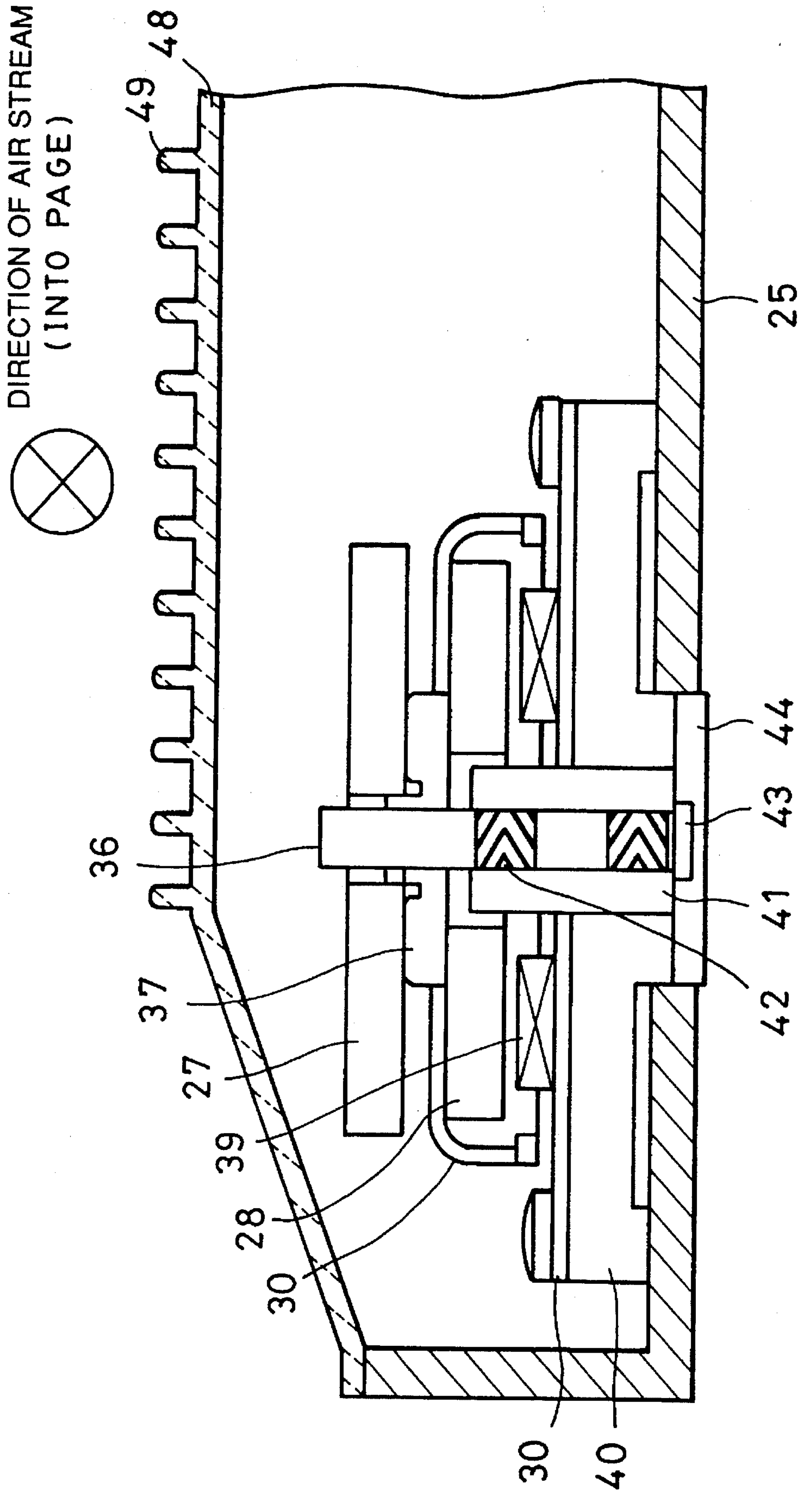
FIG. 7 is a sectional view of another embodiment of deflector means and its surroundings inside a scanner unit according to the present invention.
Figure 8:
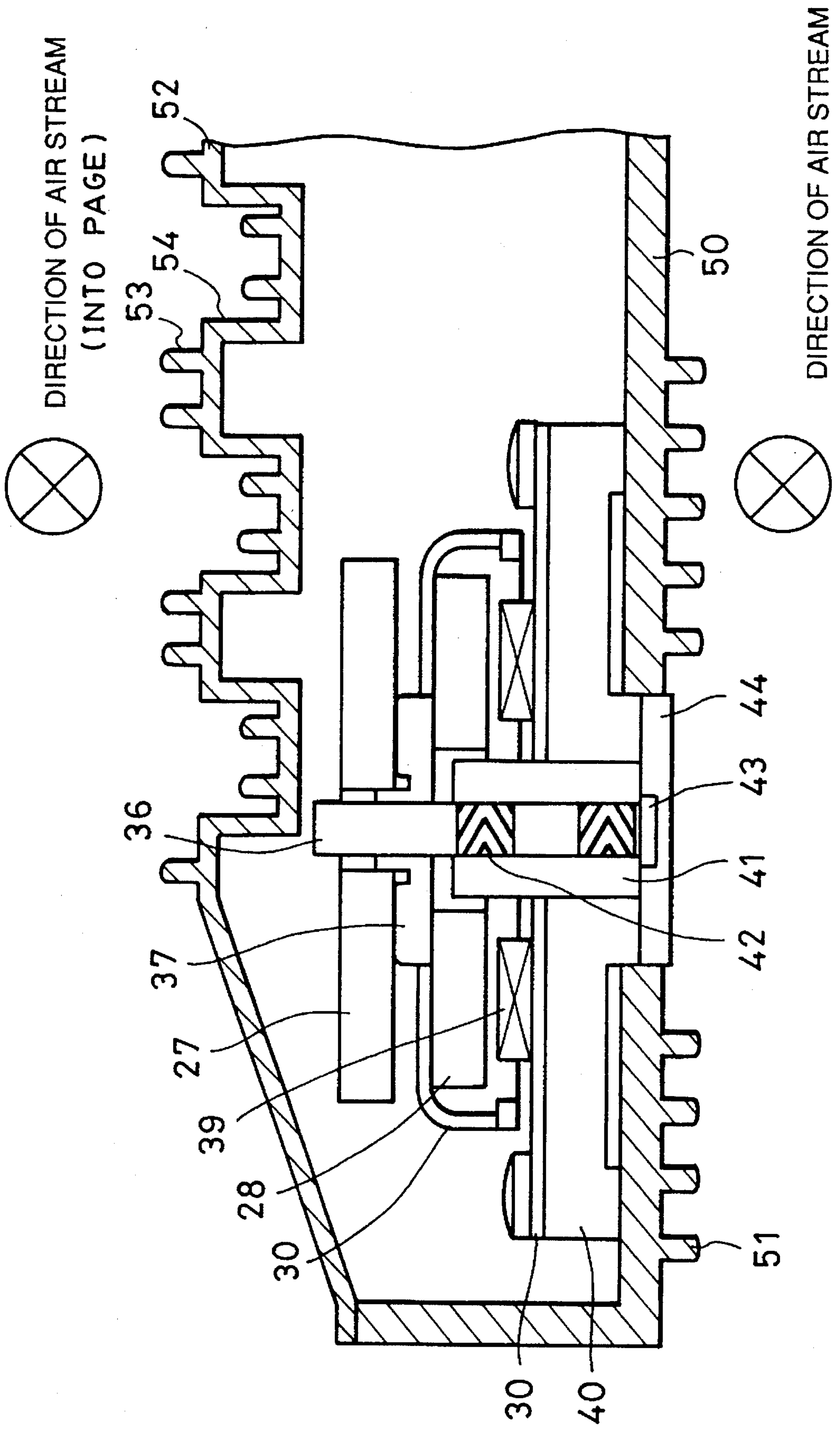
FIG. 8 is a sectional view of still another embodiment of deflector means and its surroundings inside a scanner unit according to the present invention.

FIGS. 7 and 8 illustrate different embodiments. The members having the same functions as described above are denoted by the same numerals in the figures and will not be described again. The members different from those of the above-described embodiment are denoted by different numerals and will be described.

The embodiment illustrated in FIG. 7 has an optical box 25 having a cover 48 which is formed together with many cooling fins 49. Similar to the above embodiment, the cooling fins 49 extend in the direction of the cooling air stream, thus enhancing the cooling efficiency.

The cooling fins 49 increase the surface area of the cover 48, more specifically, the area involved in heat transfer from the cover 48 to the cooling air, thus enhancing the cooling efficiency. Therefore, the temperature rise of the optical box 25 can be curbed.

The embodiment illustrated in FIG. 8 has an optical box 50 having a cover 52 which has steps 54 extending in the direction of the cooling air stream. Similar to the above embodiment, the cover 52 has many cooling fins 53. Because the plurality of steps 54 are provided, this embodiment achieves an increased surface area of the cover 52, even Greater than the surface area thereof achieved by the embodiment of FIG. 7, thus contributing to enhancement of the cooling efficiency. Further, the optical box 50 also has many cooling fins 51 formed on its outside surface. The combination of the steps 54, the cooling fins 53 provided on the cover 52 and the cooling fins 51 provided on the optical box 50 achieves further enhanced cooling efficiency, compared with the cooling efficiencies achieved by the FIG. 6 and FIG. 7 embodiments.

Further embodiments will be described with reference to FIGS. 9 to 11. Each of the embodiments has a scanner unit arranged close to a cooling fan.

Figure 9:
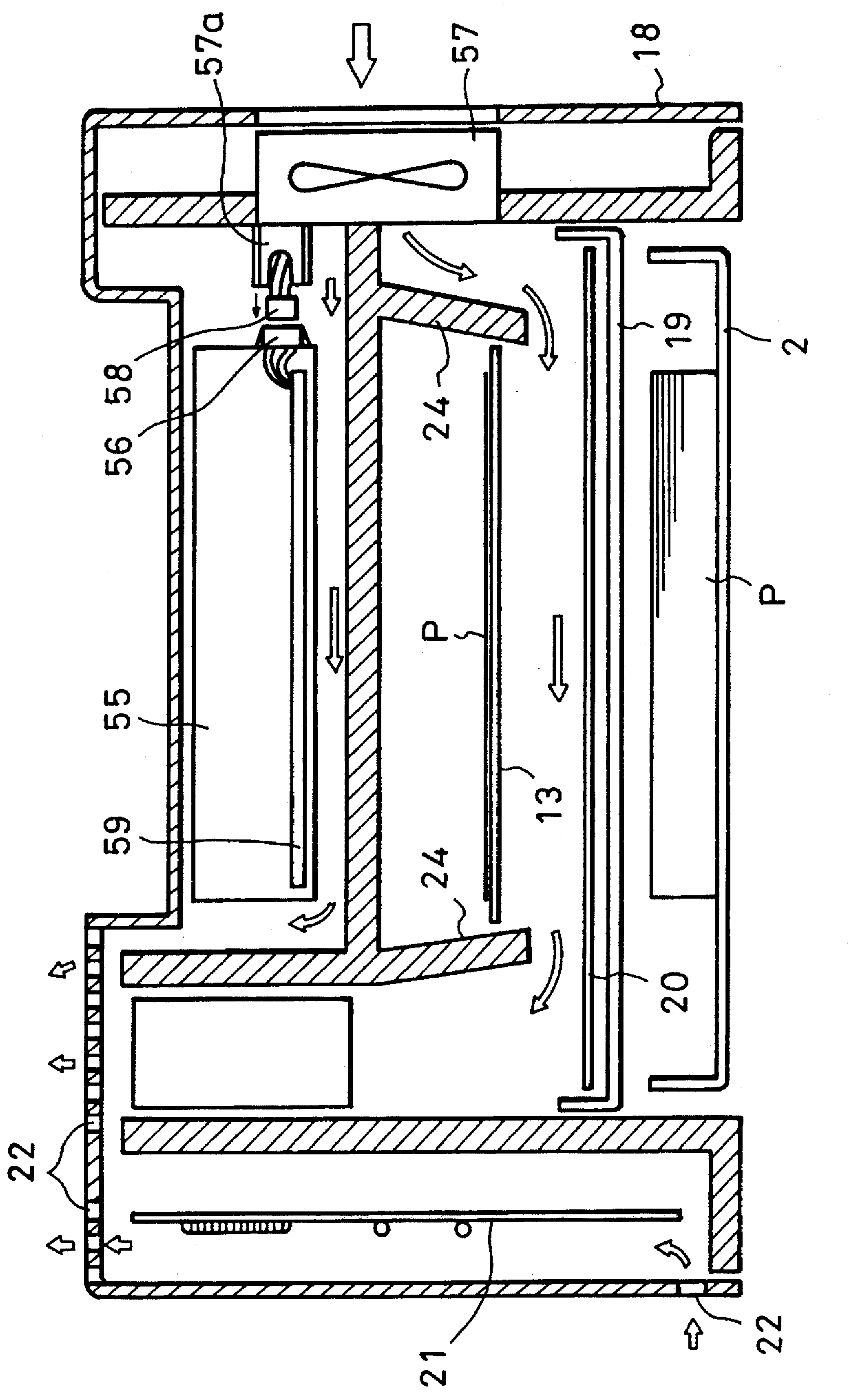
FIG. 9 is a transverse sectional view of a further embodiment of the laser beam printer apparatus of the present invention.

The embodiment illustrated in FIG. 9 is similar to the embodiment illustrated in FIG. 2, and only features of the present embodiment which differ from the FIG. 2 embodiment will be described hereinafter.

Referring to FIG. 9, a scanner unit 55 has an electronic package board 59 packaged with a laser beam scanning driving circuit including a cooling fan driving signal generating circuit which is synchronized with the timing of driving the scanner unit 55. The scanner unit 55 has on one of its sides a terminal contact (connector) 56 for outputting the cooling fan driving signals.

The casing of a cooling fan 57 has a support member for supporting a fan terminal contact (referred to as "the fan connector" hereinafter) 58 close to the scanner unit 55. The support member is positioned near the scanner unit 55 so as to facilitate connection the fan connector 58 to the connector 56. The casing of the cooling fan 57 has a supporting portion **57*a*** for supporting a wire bundle.

Thus, the connectors 56 and 58 can be easily connected either manually or automatically (e.g., by using a robot).

Because of the connection of the fan connector 58 and the connector 56 of the scanner unit 55, the cooling fan 57 is operated simultaneously when an entire apparatus driving circuit (not shown) generates a scanner driving signal, and the cooling fan 57 is stopped simultaneously when the driving circuit generates a scanner driving stop signal.

According to this embodiment, a printer apparatus is provided which has a cooling fan near a scanner unit so that the cooling fan specifically cools the scanner unit. Moreover, the printer apparatus can be easily assembled. More specifically, the electric connection between the cooling fan and the scanner unit can be achieved simply by connecting the connectors respectively provided in the cooling tan and the scanner unit, without requiring complicated electric cabling between the cooling fan and the cooling fan driving circuit. This construction facilitates automatic assembly of the printer apparatus.

Figure 10:
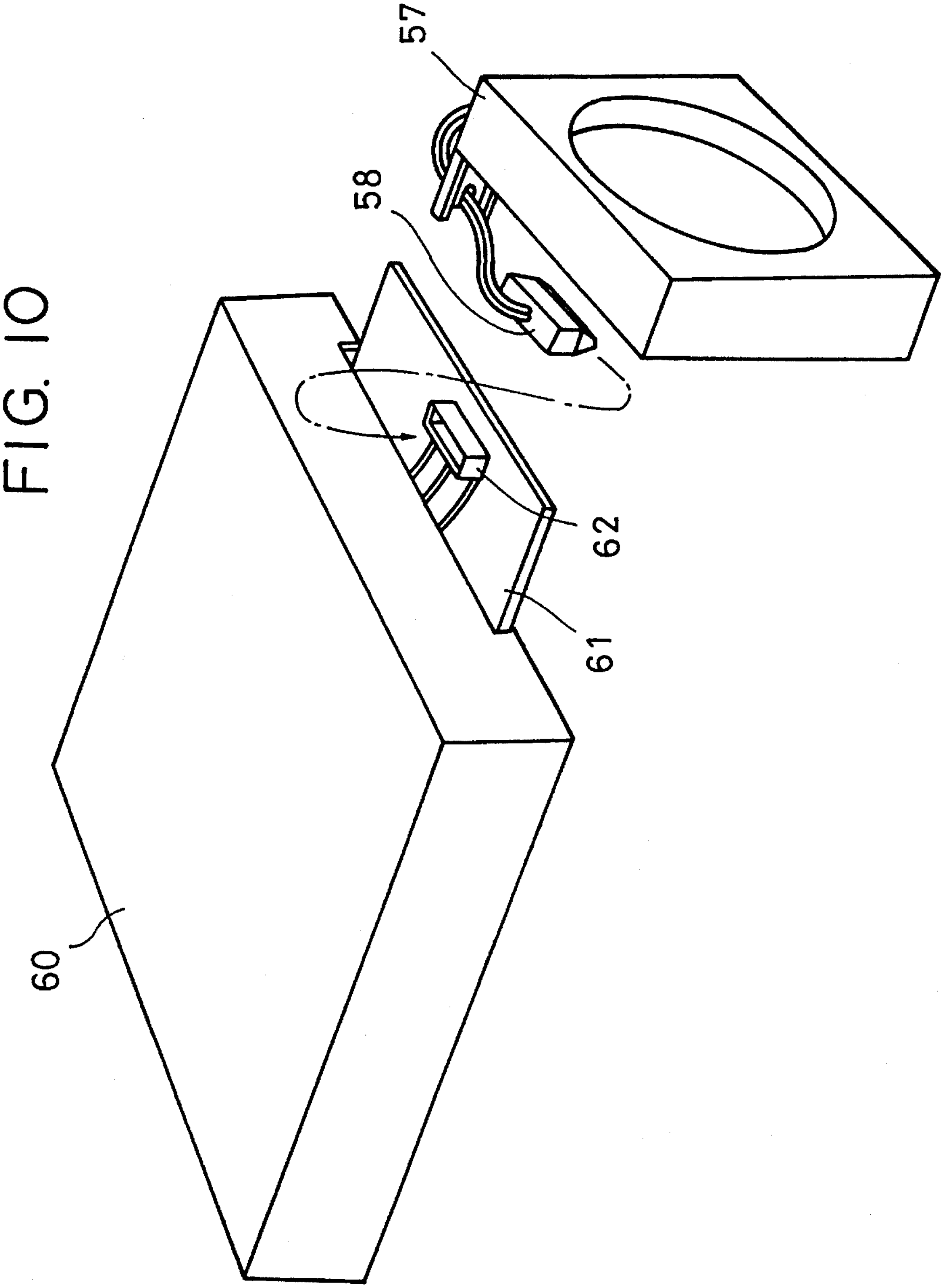
FIG. 10 illustrates an embodiment of the connection between a scanner unit and a cooling tan according to the present invention.

In the embodiment illustrated in FIG. 10, an edge portion of an electronic package board 61 of a scanner unit 60 protrudes from the casing (optical box) of the scanner unit 60. The protruding edge portion is provided with a scanner connector 62 which is to be connected to the tan connector 58. Thus, the connection between the scanner connector 62 and the cooling fan driving circuit provided on the electronic package board 61 is achieved by patterns provided on the electronic package board 61, thus eliminating the need for wiring therebetween. This embodiment also facilitates assembly of the printer apparatus.

A modification of the FIG. 9 and FIG. 10 embodiments will now be described, in which a cooling fan is provided with a fan cover.

Figure 11:
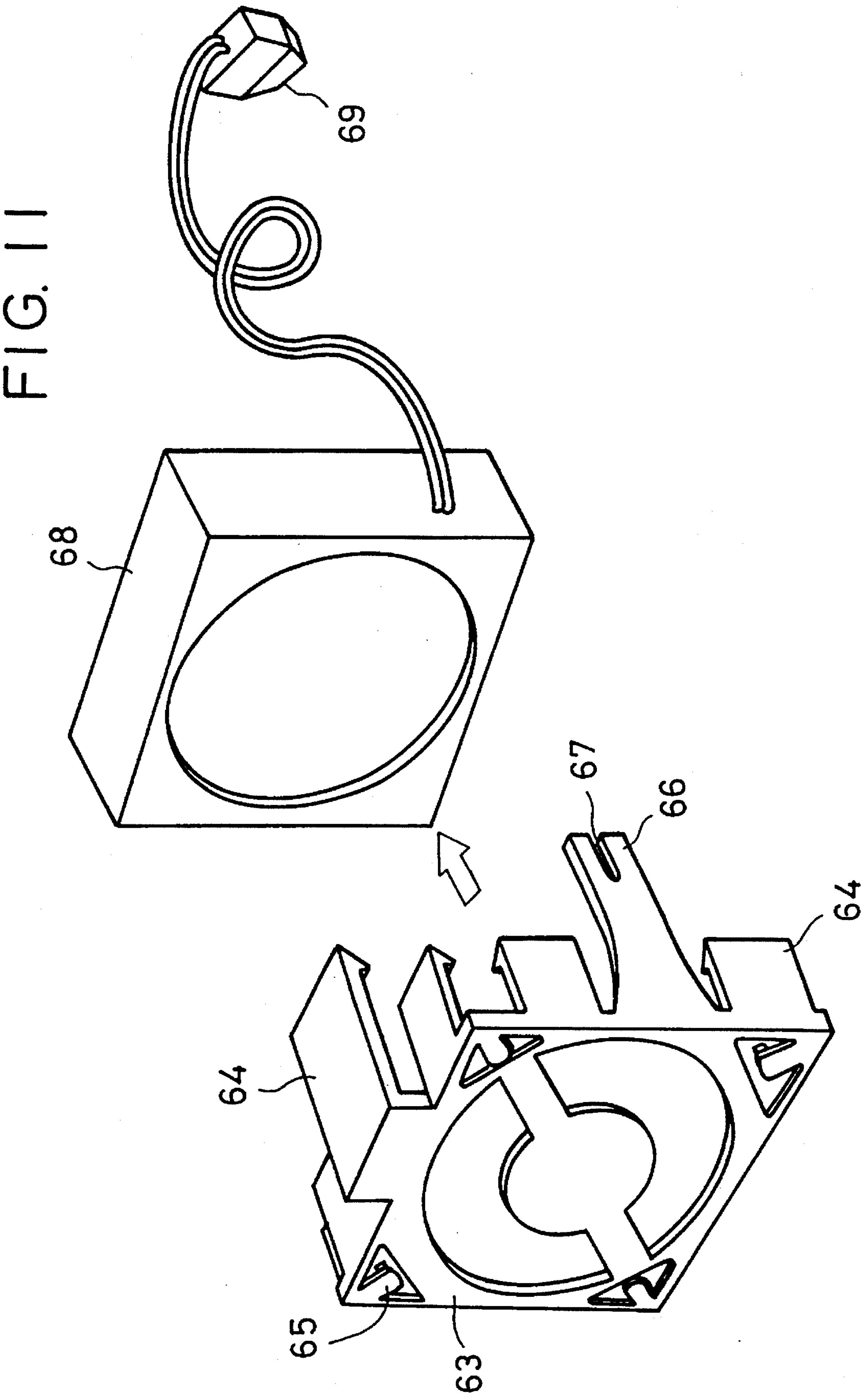
FIG. 11 illustrates a cover attached to a cooling fan according to the present invention.
Figure 12:
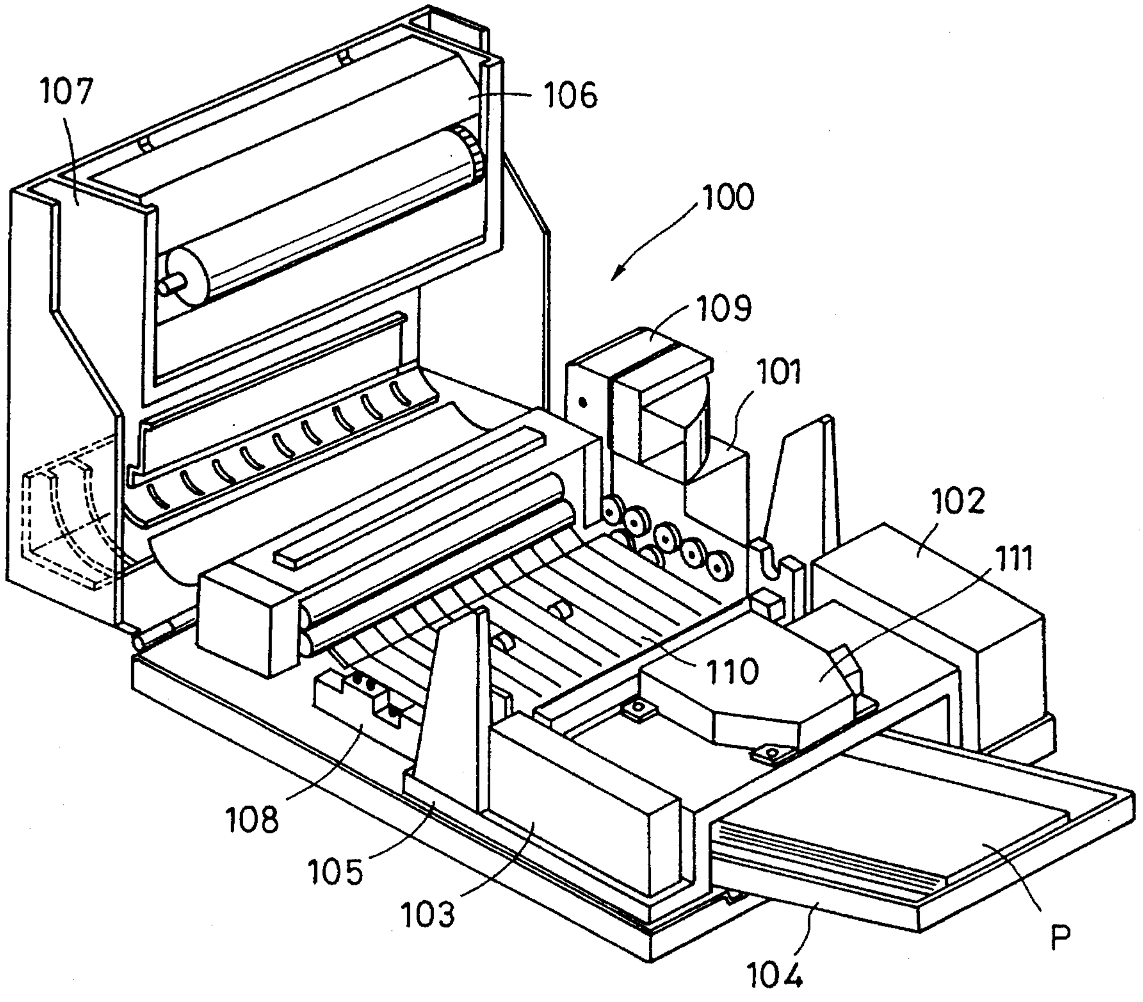
FIG. 12 (PRIOR ART)
FIG. 12 is a perspective view of a laser beam printer according to the known art.
Figure 13:
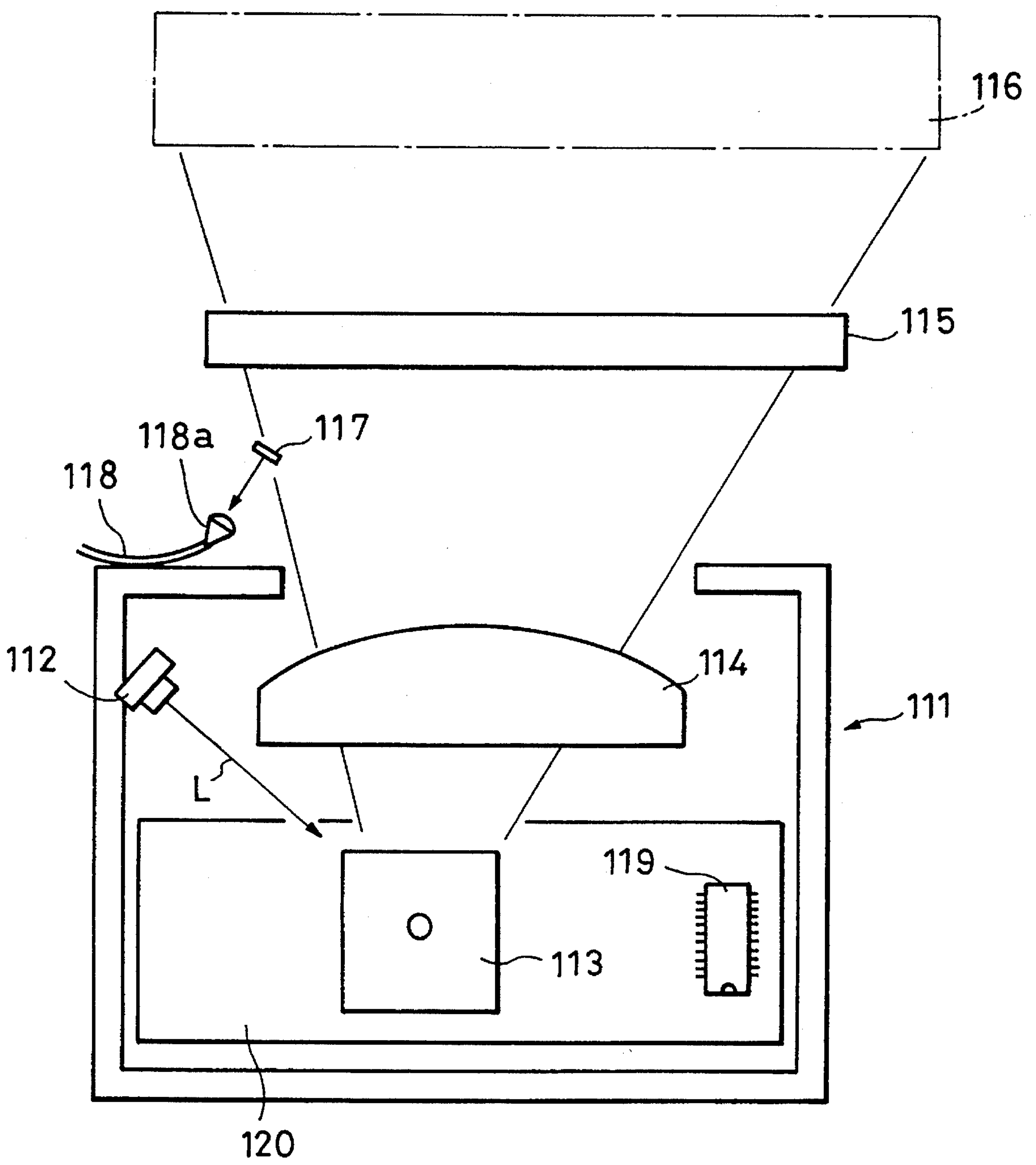
FIG. 13 (PRIOR ART)
FIG. 13 illustrates the scanner unit shown in FIG. 12.
Figure 14:
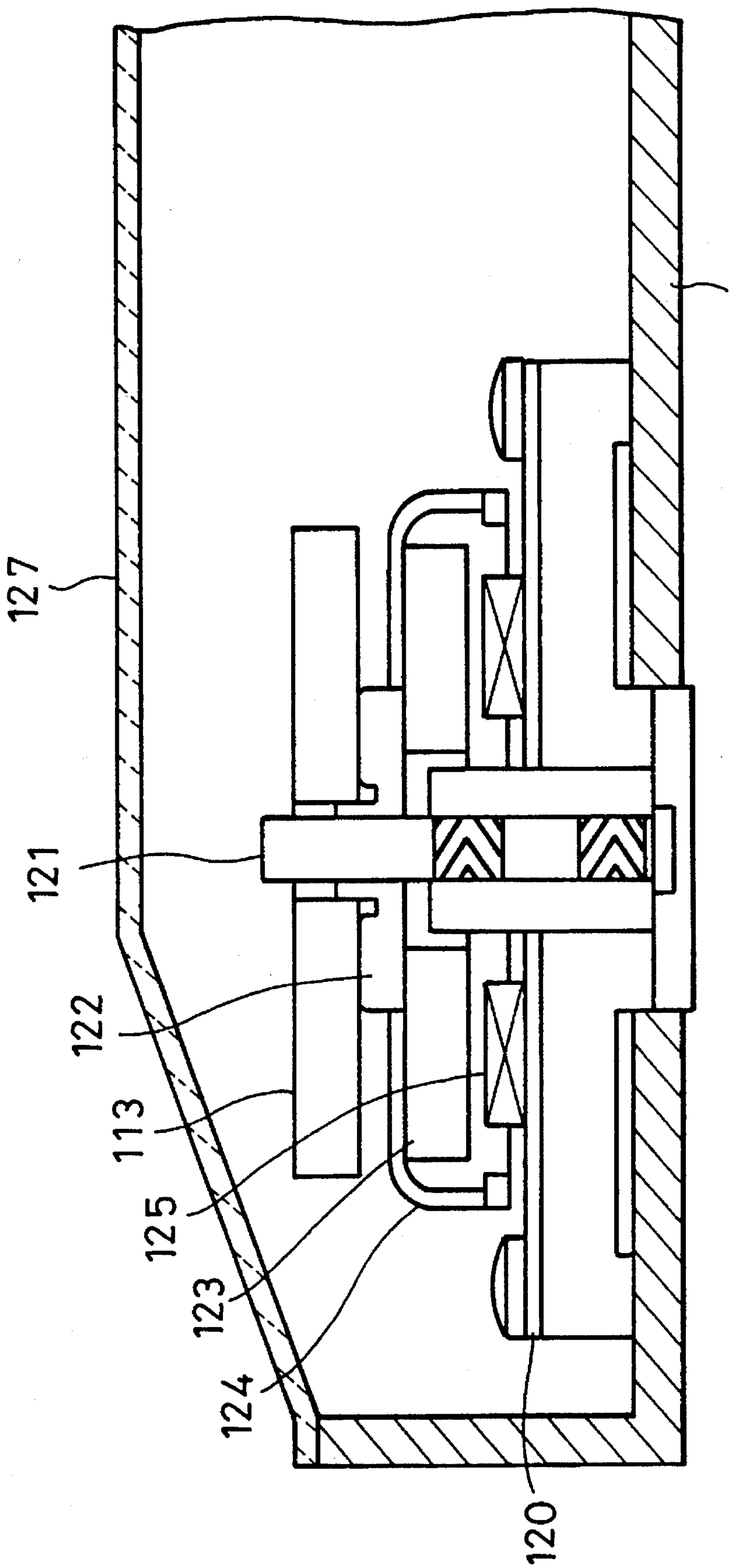
FIG. 14 (PRIOR ART)
FIG. 14 is a sectional view of deflector means and its surroundings inside the scanner unit shown in FIG. 13.

Referring to FIG. 11, a cooling fan 68 is supported by a fan cover 63. The fan cover 63 is formed of an elastic material or a mold resin having elasticity so as to elastically couple onto the periphery of the cooling fan 68. The fan cover 63 has a fan supporting portion 64 protruding like a cantilever and pressing portions 65 provided in the four corners for pressing the cooling fan 68. The fan cover 63 further has on one of its sides a fan connector supporting portion 66 having an indentation 67 by which the base or wiring portion of a fan connector 69 is supported. The thus-constructed fan cover 63 facilitates employing a commercially available cooling fan.

If the fan cover 63 is formed of an electrically conductive material (e.g., an electrically conductive resin or an SUS plate), grounding of the cooling fan 68 can be easily achieved, thus facilitating reduction of electrostatic noise produced by the cooling fan 68.

Further, the elastic fan cover 68 not only facilitates connecting the cooling fan 68 to the printer apparatus due to its snap-in structure but also damps vibration propagating from the cooling fan 68 due to its elasticity, thus reducing noise caused by the vibration of the cooling fan 68.

While the present invention has been described with reference to what are presently considered to be the preferred embodiments, it is to be understood that the invention is not limited to disclosed embodiments. To the contrary, the invention is intended to cover various modifications and equivalent arrangements included within the spirit and scope of the appended claims.

What is claimed is:

1. A laser beam printer apparatus comprising:

deflector means for deflecting a laser beam;

a plastic lens which transmits the laser beam deflected by said deflector means;

an optical box containing at least said deflector means and said plastic lens; and cooling means for cooling said optical box by drawing air in from the outside of said laser beam printer apparatus and passing the drawn-in air through said cooling means directly to said optical box.

2. A laser beam printer apparatus according to claim 1, wherein said plastic lens is an f-θ lens.

3. A laser beam printer apparatus according to claim 1, further comprising a photosensitive member, wherein said plastic lens focuses the laser beam deflected by said deflector means on said photosensitive member.

4. A laser beam printer apparatus according to claim 1, further comprising an electronic package board having a circuit component, said electronic package board being partially contained in said optical box and partially protruding from said optical box.

5. A laser beam printer apparatus according to claim 4, wherein the portion of said electronic package board protruding from said optical box has an integrated circuit.

6. A laser beam printer apparatus according to claim 4, wherein the portion of said electronic package board protruding from said optical box is provided with a heat radiating member.

7. A laser beam printer apparatus according to claim 4, wherein said electronic package board has a signal processing circuit, a control circuit and a driving circuit for said deflector means.

8. A laser beam printer apparatus according to claim 1, wherein said optical box has the shape of a spoiler.

9. A laser beam printer apparatus according to claim 1, further comprising a laser source for emitting a laser beam modulated in accordance with image signals, said laser source being contained in said optical box.

10. A laser beam printer apparatus comprising:

a photosensitive member;

deflector means for deflecting a laser beam;

a plastic lens which transmits the laser beam deflected by said deflector means;

an optical box containing at least said deflector means and said plastic lens;

developer means for applying a toner to said photosensitive member so as to develop a latent image which has been formed on said photosensitive member by a laser beam emitted from said optical box, the toner image developed by said developer means being transferred to a recording medium;

conveying means for conveying a recording medium to said photosensitive member; and an electronic package unit for controlling said laser beam printer apparatus, wherein said conveying means is arranged between said optical box and said electronic package unit.

11. A laser beam printer apparatus according to claim 10, further comprising cooling means for cooling said optical box and said electronic package unit, wherein said cooling means draws air from the outside to the inside of said laser beam printer apparatus.

12. A laser beam printer apparatus according to claim 11, wherein said conveying means includes a guide member for directing air from said cooling means to said electronic package unit, said guide member being provided relatively close to said cooling means.

13. A laser beam printer apparatus according to claim 12, wherein said conveying means conveys a recording medium carrying a toner which has not been fixed.

14. A laser beam printer apparatus comprising:

deflector means for deflecting a laser beam;

a plastic lens which transmits the laser beam deflected by said deflector means;

an optical box containing at least said deflector means and said plastic lens;

a cover member covering said optical box; and cooling means for cooling said optical box, wherein at least one of said optical box and said cover member has a fin for cooling.

15. A laser beam printer apparatus according to claim 14, wherein said cooling means cools by circulating air and wherein said fin extends in the direction of the airflow produced by said cooling means.

16. A laser beam printer apparatus according to claim 14, wherein said plastic lens is an f-θ lens.

17. A laser beam printer apparatus according to claim 14, wherein said cooling means draws air from the outside to the inside of said laser beam printer apparatus.

18. A laser beam printer apparatus according to claim 14, wherein said fin is formed together with or connected firmly to a bottom portion of said optical box.

19. A laser beam printer apparatus according to claim 14, wherein said fin is formed together with or connected firmly to said cover member.

20. A laser beam printer apparatus according to claim 14, wherein said cover member has a step structure.

21. A laser beam printer apparatus comprising:

deflector means for deflecting a laser beam;

a lens which transmits the laser beam deflected by said deflector means;

an optical box containing at least said deflector means and said lens; and cooling means for cooling said optical box, wherein said cooling means is provided near said optical box and is electrically connected to said optical box.

22. A laser beam printer apparatus according to claim 21, wherein said optical box further contains an electronic package board for emitting the laser beam deflected by said deflector means from said optical box, said electronic package board being provided with a connector portion for outputting a driving signal to said cooling means.

23. A laser beam printer apparatus according to claim 21, wherein said lens is a plastic lens.

24. A laser beam printer apparatus according to claim 21, wherein said cooling means draws air from the outside to the inside of said laser beam primer apparatus.

25. A laser beam printer apparatus according to claim 21, wherein said optical box has a tin for cooling.

26. A laser beam printer apparatus according to claim 1, further comprising an electronic package board having a circuit component for driving said deflector means, said electronic package board being at least partially contained in said optical box.

27. A laser beam printer apparatus according to claim 26, wherein said electronic package board partially protrudes from said optical box.

28. A laser beam printer apparatus according to claim 14, further comprising a laser light source contained in said optical box together with said deflector means and said plastic lens, said laser light source for generating the laser beam, wherein the laser beam is deflected by said deflector means and transmitted by said plastic lens toward a photosensitive member.

* * * * *

UNITED STATES PATENT AND TRADEMARK OFFICE

CERTIFICATE OF CORRECTION

PATENT NO. : 5,510,827

DATED : April 23, 1996

INVENTOR(S) : Kubota, et al.

It is certified that error appears in the above-indentified patent and that said Letters Patent is hereby corrected as shown below:

TITLE PAGE, ITEM

[56], "0527531 2/1993 Japan" should read --5-27531 2/1993 Japan--.

COLUMN 3:

Line 2, "tan" should read --fan--.

COLUMN 4:

Line 26, "co" should read --to--;
Line 31, "no" should read --to--;
Line 50, "fiber" should read --fiber 34,--; and
Line 61, "0n" should read --On--.

UNITED STATES PATENT AND TRADEMARK OFFICE

CERTIFICATE OF CORRECTION

PATENT NO. : 5,510,827

DATED : April 23, 1996

INVENTOR(S) : Kubota, et al.

It is certified that error appears in the above-indentified patent and that said Letters Patent is hereby corrected as shown below:

COLUMN 7:

Line 7, "Greater" should read --greater--;
Line 52, "tan" should read --fan--; and
Line 61, "tan" should read --fan--.

COLUMN 10:

Line 34, "primer" should read --printer--; and
Line 36, "tin" should read --fin--.

Signed and Sealed this

Third Day of September, 1996

Attest:

BRUCE LEHMAN

Attesting Officer

Commissioner of Patents and Trademarks